United States Patent
Throckmorton et al.

[15] 3,676,411
[45] July 11, 1972

[54] TERNARY CATALYST SYSTEMS FOR THE POLYMERIZATION OF CONJUGATED DIOLEFINS

[72] Inventors: Morford C. Throckmorton; William M. Saltman, both of Akron, Ohio

[73] Assignee: The Goodyear Tire & Rubber Company, Akron, Ohio

[22] Filed: Dec. 17, 1970

[21] Appl. No.: 99,257

[52] U.S. Cl......................260/82.1, 252/431 R, 252/431 C, 260/94.3
[51] Int. Cl......................C08d 1/14, C08d 3/06, C08d 3/04
[58] Field of Search..................260/82.1, 94.3; 252/431 R, 252/431 C

[56] References Cited

UNITED STATES PATENTS

| | | | |
|---|---|---|---|
| 2,762,790 | 9/1956 | Greene | 260/82.5 |
| 3,049,529 | 8/1962 | Wicklatz | 260/94.9 |
| 3,173,901 | 3/1965 | Newberg et al. | 260/88.2 |

*Primary Examiner*—Joseph L. Schofer
*Assistant Examiner*—Richard A. Gaither
*Attorney*—F. W. Brunner and J. Y. Clowney

[57] ABSTRACT

There is disclosed a process for the polymerization of conjugated diolefins and mixtures thereof which comprises contacting at least one conjugated diolefin with a catalyst system comprising (A) at least one compound selected from the group consisting of metal salts of carboxylic acids, metal salts of inorganic acids and organic complex compounds of metals wherein the metal is selected from a group consisting of uranium and thorium, (B) at least one trialkylaluminum or dialkylaluminum hydride, and (C) at least one halide ion containing compound selected from a group consisting of hydrogen halides, organometallic halides wherein the metal is selected from Groups II, III-A and IV-A of the Periodic Table and halides of metals of Groups III, IV, V, VI-B and VIII of the Periodic Table.

10 Claims, No Drawings

TERNARY CATALYST SYSTEMS FOR THE POLYMERIZATION OF CONJUGATED DIOLEFINS

This invention is directed to a process for the polymerization of conjugated diolefins and mixtures thereof to form polymers and copolymers having a high proportion of the polymer repeat units in the 1,4-configuration and having high molecular weights. More particularly, this invention is directed to catalyst systems useful for this purpose.

Polymers and copolymers of conjugated diolefins containing a high proportion of the polymer repeat units in the 1,4-configuration and having high molecular weights possess properties which make them useful as synthetic rubbers. For this reason these polymers have obtained a prominent position in the rubber industry.

Various catalytically promoted polymerization processes are available for producing polymers of conjugated diolefins and mixtures thereof. Many of these processes employ catalysts of either the Ziegler-Natta type or alkali metal catalysts such as butyllithium. Other catalytically promoted polymerization processes involving conjugated diolefins employ catalyst systems consisting of cobalt or nickel based compounds in conjunction with an organometallic compound and a halogen-containing compound. These latter catalyst systems are of particular interest since they yield diene polymers in which the polymer repeat units are in a predominantly 1,4-configuration. It is this high content of 1,4-configuration in conjunction with high molecular weight which makes these particular polymers so attractive.

There has now been found a new class of three component catalyst systems which will produce polymers from conjugated diolefins and mixtures thereof containing predominantly the 1,4-configuration and having high molecular weights. Accordingly, the present invention provides a process for polymerizing conjugated diolefins and mixtures thereof to form polymers and copolymers containing 90 percent or more of the polymer repeat units in the 1,4-configuration by contacting, under solution polymerization conditions, at least one conjugated diolefin with a catalyst system comprising (A) at least one compound selected from a group consisting of metal salts of carboxylic acids, metal salts of inorganic acids and organic complex compounds of metals wherein the metal is selected from the group consisting of uranium and thorium, (B) at least one compound selected from the group consisting of trialkylaluminum and dialkylaluminum hydrides and (C) at least one halide ion containing compound selected from the group consisting of (1) hydrogen halides, (2) alkyl, aryl, aralkyl, alkaryl and cycloalkyl metal halides wherein the metal is selected from Groups II, IIIA and IVA of the Periodic Table, and (3) halides of metals of Groups III, IV, V, VIB and VIII of the Periodic Table.

The monomers which are useful in the practice of this invention are those monomers commonly known as conjugated diolefins and which correspond to the general formula

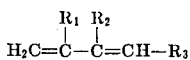

wherein $R_1$, $R_2$ and $R_3$ are selected from a group consisting of hydrogen and alkyl radicals containing about one to about 10 carbon atoms and wherein $R_1$, $R_2$ and $R_3$ may or may not be the same. Representative examples of conjugated diolefins corresponding to the above general formula include 1,3-butadiene; isoprene; 1,3-pentadiene; 2,3-dimethyl-1,3-butadiene; 2-methyl-3-ethyl-1,3-butadiene; 1,3-hexadiene; 3-methyl-1,3-pentadiene and the like.

The conjugated diolefins corresponding to the above general formula can be polymerized either alone or in combination with each other to form homopolymers or copolymers containing 90 percent or more of the polymer repeat units in the 1,4-configuration. For example, when 1,3-butadiene is polymerized alone, employing the catalyst systems described hereinbelow, polybutadiene containing a very high content of the desired 1,4-configuration can be obtained in excellent yields. When 1,3-butadiene is polymerized in mixture with isoprene a copolymer of butadiene and isoprene, containing a high percentage of the desired 1,4-configuration, can also be obtained in very good yield. One skilled or having skill in this art can readily see that a variety of conjugated diolefins and mixtures thereof can be polymerized in accordance with the teachings of the present invention.

The catalyst systems of the present invention are comprised of three components selected from the groups designated as catalyst components (A), (B) and (C). The (A) catalyst component is selected from a group consisting of metal salts of carboxylic acids, metal salts of inorganic acids and organic complex compounds of metals, wherein the metal is selected from a group consisting of uranium and thorium. The uranium and thorium salts of carboxylic acids and the organic complex compounds of uranium and thorium include compounds characterized by bonding between these metals and a mono- or bidentate organic ligand containing up to 20 carbon atoms. The term "ligand" is defined as an ion or molecule bound to and considered bonded to a metal atom or ion. Mono-dentate means having one position through which covalent or coordinate bonds with a metal may be formed, bidentate means having two positions through which covalent or coordinate bonds with a metal may be formed.

Representative examples of uranium compounds which may be employed as the (A) catalyst component include uranium acetylacetonate, uranyl acetylacetonate, uranium tetra-(1-phenyl-1,3-hexanedione), uranyl benzoate, ethyl uranate, tris(pi-cyclopentadienyl)uranium chloride, uranium fluoride and the like. Representative examples of thorium compounds include thorium acetylacetonate, thorium oxalate, thorium fluoride and the like. The most preferred of the above compounds are the uranium salts of carboxylic acids, and the organic complex compounds of uranium.

The (B) catalyst component of the present invention is selected from a group consisting of trialkylaluminum and dialkylaluminum hydrides corresponding to the general formula

in which $R_1$ is selected from a group consisting of hydrogen and a monovalent hydrocarbon radical such as alkyl, alkenyl, aryl, aralkyl, alkaryl, cycloalkyl and alkoxy containing from about one to about 20 carbon atoms and wherein $R_2$ and $R_3$ are monovalent hydrocarbon radicals selected from a group consisting of alkyls, alkenyls, aryls, aralkyls, alkaryls and cycloalkyls containing from one to about 20 carbon atoms. Representative of the trialkylaluminum compounds corresponding to the formula set forth above are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, methyl diphenyl aluminum, ethyl-di-p-tolyl aluminum, ethyl dibenzyl aluminum, diethyl phenyl aluminum, diethyl-p-tolyl aluminum, diethylbenzyl aluminum and the like. Representative examples of dialkyl aluminum hydrides corresponding to the formula set forth above include diethyl aluminum hydride, di-n-propyl aluminum hydride, diisopropyl aluminum hydride, di-n-butyl aluminum hydride, diisobutyl aluminum hydride, diphenyl aluminum hydride, di-t-tolyl aluminum hydride, dibenzyl aluminum hydride, phenyl ethyl aluminum hydride, phenyl-n-propyl aluminum hydride, p-tolyl ethyl aluminum hydride, p-tolyl-n-propyl aluminum hydride, p-tolylisopropyl aluminum hydride, benzyl ethylaluminum hydride and the like.

The halide ion containing compounds useful as the (C) catalyst components are selected from a group consisting of (1) hydrogen halides, (2) organometallic halides wherein the metal is selected from Groups II, III-A and IV-A of the Periodic Table, and (3) halides of metals of Groups III, IV, V, VI-B and VIII of the Periodic Table. Representative examples of such compounds include hydrogen bromide, hydrogen chloride, hydrogen fluoride and hydrogen iodide; ethylmagnesium bromide, phenylmagnesium bromide, butylmagnesium chloride, methylmagnesium iodide, phenylmagnesium iodide, diethylaluminum bromide, diisobutylmagnesium bromide, methylaluminum sesquibromide, isobutylaluminum dibromide, diethylaluminum chloride, ethylaluminum sesquichloride, ethylaluminum dichloride, cyclohexylaluminum dichloride, phenylaluminum dichloride, diethylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; and aluminum bromide, aluminum chloride, aluminum iodide, antimony pentachloride, antimony trichloride, boron tribromide, boron trichloride, boron triiodide, ferric chloride, gallium trichloride, molybdenum pentachloride, phosphorus tribromide, phosphorus pentachloride, stannic chloride, titanium tetrachloride, titanium tetraiodide, tungsten hexachloride and the like.

The catalyst components of the present invention are usually employed as solutions or suspensions in an inert solvent. An inert solvent may be defined as one that does not adversely affect the individual catalyst components. Such solvents are usually aliphatic, aromatic and cycloaliphatic hydrocarbons such as pentane, hexane, heptane, benzene, toluene, cyclohexane and the like.

The three component catalyst system of this invention has shown polymerization activity over a wide range of catalyst concentrations and catalyst ratios. Apparently, the three catalyst components interact to form an active catalyst species. As a result, the optimum concentration for any one catalyst component is dependent upon the concentration of the remaining catalyst components. Although polymerization will occur over a wide range of catalyst concentrations and ratios, polymers having the most desirable properties are obtained over a more narrow range. It has been found that polymerization will occur when the mole ratio of the (B) catalyst component to the (A) catalyst component ranges from about 5/1 to about 60/1, and when the mole ratio of the (C) catalyst component to the (A) catalyst component ranges from about 0.5/1 to about 2.5/1. When the (C) catalyst component is a fluorine containing compound the mole ratio of (C)/(A) ranges from about 1/1 to about 22/1. The preferred (B)/(A) mole ratio ranges from about 6:1 to about 40:1 and the preferred (C)/(A) mole ratio ranges from about 0.7:1 to about 1.5:1.

The three catalyst components may be charged to the polymerization system as separate catalyst components in either a step-wise or a simultaneous manner, sometimes called "in situ." The three component catalyst may also be "preformed" outside the polymerization system whereby all the catalyst components are mixed in the absence of the monomer to be polymerized either with or without an inert diluent and the resulting complete blend then added to the polymerization system.

The catalyst may also be "preformed" outside the polymerization system whereby all the catalyst components are mixed in the presence of small amounts of at least one compound selected from a group consisting of butadiene or other conjugated diolefins, triolefins and acetylenic compounds. The amount of the compound selected from this group can vary over a wide range but must be a catalytic amount. For good results the molar ratio of this compound to the (A) catalyst component can range from about 1/1 to about 1,000/1. The preferred mole ratio of this compound to the (A) catalyst component ranges from about 3/1 to about 300/1.

The concentration of the total catalyst system employed depends on a number of factors such as purity of reactants, polymerization rate desired, temperature and other factors. Therefore, specific concentrations cannot be set forth except to say that catalytic amounts of the individual catalyst system components must be employed. Some specific concentrations and ratios which produced polymers having desirable properties will be illustrated in the examples set forth hereinbelow to explain the teachings of this invention.

In general, the polymerizations of this invention are carried out in an inert solvent and thus are solution polymerizations. By the term "inert solvent" is meant that the solvent or diluent does not enter into the structure of the resulting polymer nor does it adversely affect the properties of the resulting polymer, nor does it adversely affect the activity of the catalyst employed. Such solvents are usually aliphatic, aromatic, cycloaliphatic hydrocarbons and ethers representative of which include pentane, hexane, heptane, toluene, benzene, cyclohexane, diisopropylether and the like. Preferred solvents are hexane and benzene. The solvent to monomer volume ratio may be varied over a wide range. Up to 20 or more to 1 volume ratio of solvent to monomer can be employed. It is usually preferred or more convenient to use a solvent to monomer volume ratio of about 3/1 to about 6/1. Suspension polymerization may be carried out by using a solvent such as butane or pentane in which the polymer form is insoluble. It should be understood, however, that it is not intended to exclude bulk polymerizations from the scope of this application. Therefore, the polymerization may be either a continuous or batch type.

In the practice of this invention it is usually desirable to conduct the polymerizations of this invention employing air-free and moisture-free techniques.

The temperatures employed in the practice of this invention have not been found to be critical and may vary from a low temperature such as −10°C. or lower up to high temperatures of 100°C. or higher. However, a more desirable temperature range is between 20°C. and about 80°C. Ambient pressures are usually employed but a higher or a lower pressure may also be employed.

As employed in this specification, inherent viscosity [η] is defined as the natural logarithm of the relative viscosity at 30°C. divided by the polymer concentration for a 0.5 percent (wt/vol) solution in toluene and is expressed in deciliters per gram (dl/g).

The microstructure of the polymers was determined by infrared analysis.

The practice of this invention is further illustrated by reference to the following examples which are intended to be representative rather than restrictive of the scope of the invention.

EXAMPLE I

A purified butadiene (BD) in benzene solution containing 100 grams (g) of butadiene per liter of solution was charged to a number of 4-ounce reaction bottles. Nitrogen was flushed over the surface of the premix and the catalyst charged in situ in the amounts shown in Table 1 below. The catalyst system employed consisted of (1) triisobutylaluminum (TIBA), (2) uranyl acetylacetonate [UO$_2$(AcAc)$_2$] and (3) diethylaluminum bromide (DEAB). After the addition of the individual catalyst components, each bottle was tightly sealed and tumbled end-over-end for 18 hours in a 50°C. water bath. All pertinent data are listed in Table 1 below.

TABLE 1

| Experiment No. | Millimoles/100 g. BD | | | Yield, weight percent | [η] | Microstructure, percent | | |
|---|---|---|---|---|---|---|---|---|
| | TIBA | UO$_2$(AcAc)$_2$ | DEAB | | | Cis | Trans | 1,2- |
| 1 | 8.0 | 0.35 | 0.4 | 54 | 2.3 | | | |
| 2 | 10.0 | 0.35 | 0.4 | 60 | 2.0 | | | |
| 3 | 10.0 | 0.50 | 0.6 | 81 | 2.1 | 85.3 | 13.1 | 1.6 |
| 4 | 10.0 | 0.90 | 1.0 | 83 | 2.5 | | | |
| 5 | 15.0 | 0.90 | 1.0 | 100 | 2.1 | 80.4 | 18.0 | 1.6 |

EXAMPLE II

A series of experiments similar to Example I was carried out except that a catalyst system consisting of (1) TIBA, (2) $UO_2(AcAc)_2$ and (3) hydrogen iodide (HI) was employed. Again all bottles were flushed with nitrogen, tightly sealed and tumbled end-over-end for 18 hours in a 50°C. water bath. Table 2 contains all relevant data.

TABLE 2

| Experiment No. | Millimoles/100 g. BD | | | Yield, weight percent | $[\eta]$ | Microstructure, percent | | |
|---|---|---|---|---|---|---|---|---|
| | TIBA | $UO_2[AcAc]_2$ | HI | | | Cis | Trans | 1,2- |
| 1 | 8.0 | 0.35 | 0.4 | 64 | 2.0 | 75.2 | 22.2 | 2.6 |
| 2 | 10.0 | 0.50 | 0.6 | 92 | 2.4 | 73.2 | 24.2 | 2.6 |
| 3 | 10.0 | 0.90 | 1.0 | 100 | 3.2 | 69.4 | 27.8 | 2.8 |

EXAMPLE III

A series of experiments similar to Example I was carried out except that diethylaluminum bromide (DEAB) was replaced with diethylaluminum chloride (DEAC). The catalyst system employed in the present series of experiments thus consists of (1) TIBA, (2) $UO_2[AcAc]_2$ and (3) DEAC. All the bottles were terminated after tumbling end-over-end for 18 hours in a 50°C. water bath. All data obtained in this series of experiments are listed in Table 3 below.

TABLE 3

| Experiment No. | Millimoles/100 g. BD | | | Yield, weight percent | $[\eta]$ | Microstructure, percent | | |
|---|---|---|---|---|---|---|---|---|
| | TIBA | $UO_2[AcAc]_2$ | DEAC | | | Cis | Trans | 1,2- |
| 1 | 10 | 0.5 | 0.6 | 48 | 1.8 | 88.5 | 9.7 | 1.8 |
| 2 | 8 | 0.9 | 1.0 | 40 | | 86.3 | 11.7 | 2.0 |
| 3 | 15 | 0.9 | 1.0 | 77 | 1.7 | 86.7 | 11.5 | 1.8 |

EXAMPLE IV

A series of experiments was conducted at conditions similar to those utilized in Examples I and II except that the polymerizations were carried out in hexane rather than benzene. Experiments Nos. 1 and 3 were continued for a total time of 42 hours rather than the 18 hours used in the other experiments. Data are presented in Table 4:

TABLE 4

| Experiment No. | Millimoles/100 g. BD | | | Yield, weight percent | $[\eta]$ | Microstructure, percent | | |
|---|---|---|---|---|---|---|---|---|
| | TIHA | $UO_2(AcAc)_2$ | Halide DEAB | | | Cis | Trans | 1,2- |
| 1 | 15 | 0.5 | 0.6 | 56 | | | | |
| 2 | 15 | 0.9 | 1.0 | 43 | 1.3 | 89.5 | 9.1 | 1.4 |
| 3 | 15 | 0.9 | 1.2 | 68 | | | | |
| 4 | 20 | 0.9 | 1.0 | 68 | 1.2 | | | |
| | | | HI | | | | | |
| 5 | 15 | 0.9 | 1.0 | 65 | 1.4 | 72.2 | 25.2 | 2.6 |
| 6 | 15 | 1.5 | 1.6 | 63 | 1.5 | | | |
| 7 | 20 | 0.9 | 1.0 | 80 | 1.3 | | | |

EXAMPLE V

A series of polymerization experiments was conducted under conditions similar to those outlined in Example I above except that a variety of trialkylaluminum compounds and one alkylaluminum hydride compound were employed as the (B) catalyst component. The trialkylaluminum compounds employed included triethylaluminum (TEA), tri-n-propylaluminum (TNPA), tri-n-butylaluminum (TNBA), tri-n-hexylaluminum (TNHA), triisohexylaluminum (TIHA) and tri-n-octylaluminum (TNOA) and the one alkylaluminum hydride compound employed was diisobutyl aluminum hydride (DIBAH). Uranyl acetylacetonate $[UO_2(AcAc)_2]$ was employed as the (A) catalyst component and diethylaluminum bromide (DEAB) as the (C) catalyst component. The amount of $UO_2(AcAc)_2$ and DEAB employed was 0.9 and 1.1 millimoles per 100 grams of butadiene (BD) respectively for all experiments. Pertinent data are listed in the table below. Column 1 sets forth the experiment number, column 2 the specific (B) catalyst component employed, column 3 the millimoles per 100 g. of BD of catalyst component (B) in the catalyst system, column 4 the weight percent yield, column 5 the inherent viscosity $[\eta]$ of the polymer and columns 6 and 7 the percent of cis and trans microstructure in the polymer.

TABLE 5

| Experiment No. | (B) catalyst component | Millimoles per 100 g. BD | Yield, weight percent | $[\eta]$ | Microstructure, percent | |
|---|---|---|---|---|---|---|
| | | | | | Cis | Trans |
| 1 | TEA | 10 | 85 | 1.5 | 83 | 15 |
| 2 | TNPA | 8 | 68 | 2.1 | 84 | 14 |
| 3 | TNBA | 8 | 47 | 2.1 | 85 | 13 |
| 4 | TNHA | 8 | 37 | 2.7 | 85 | 13 |
| 5 | TIHA | 8 | 95 | 2.5 | 81 | 17 |
| 6 | TNOA | 8 | 65 | 2.4 | 86 | 13 |
| 7 | DIBAH | 6 | 57 | 3.7 | 36 | 13 |

EXAMPLE VI

A series of polymerization experiments was carried out using the experimental procedure set forth in Example I but employing a variety of catalyst systems to illustrate how polymers having widely varying molecular weights can be prepared. Uranyl acetylacetonate $[UO_2(AcAc)_2]$ was employed as the (A) catalyst component throughout this series.

The (B) catalyst component was selected from a group consisting of triisohexylaluminum (TIHA) and triisobutylaluminum (TIBA) and the (C) catalyst component was selected from a group consisting of hydrogen iodide (HI), hydrogen bromide (HBr), diethylaluminum bromide (DEAB) and diethylaluminum chloride (DEAC). Table 6 contains all pertinent data.

TABLE 6

| Experiment No. | Component | | Millimoles/100 g. BD | | | Yield, weight percent | $[\eta]$ |
|---|---|---|---|---|---|---|---|
| | (B) | (C) | (A) | (B) | (C) | | |
| 1 | TIHA | HI | 0.9 | 6 | 1.1 | 68 | 5.8 |
| 2 | TIHA | HBr | 0.9 | 6 | 1.1 | 78 | 4.8 |
| 3 | TIHA | HBr | 0.9 | 8 | 1.1 | 94 | 3.8 |
| 4 | TIBA | HBr | 0.9 | 15 | 1.1 | 99 | 2.8 |
| 5 | TIHA | DEAB | 0.9 | 8 | 1.1 | 95 | 2.5 |
| 6 | TIBA | DEAC | 0.9 | 15 | 1.1 | 72 | 2.1 |

The polymer prepared in Experiment No. 4 had a number average (Mn) molecular weight of 134,500 as determined by the osmotic pressure method employing a permeable membrane in a Mechro-Lab instrument.

EXAMPLE VII

A series of polymerization experiments was conducted under conditions similar to those utilized in Example I and II above except that uranyl benzoate [$UO_2Bz_2$] was used in place of the uranyl acetylacetonate and the solutions were allowed to polymerize for 44 hours. Experiment No. 8 was conducted at 80°C. All the other experiments were carried out at 50°C. Table 7 sets forth all pertinent data. Diethylaluminum bromide (DEAB) was employed as the (C) catalyst component in Experiments Nos. 1–5. In Experiments Nos. 6–8 hydrogen iodide was employed as the (C) catalyst component.

TABLE 7

| Experiment No. | Millimoles/100 g. BD | | | Yield, weight percent | [$\eta$] | Microstructure, percent | | |
|---|---|---|---|---|---|---|---|---|
| | TIBA | $UO_2Bz_2$ | (C) | | | Cis | Trans | 1,2 |
| 1 | 15 | 0.9 | 0.9 | 55 | 1.7 | | | |
| 2 | 15 | 0.9 | 1.1 | 62 | 1.6 | 88 | 10 | 2 |
| 3 | 15 | 1.5 | 1.5 | 75 | 1.8 | 87 | 11 | 2 |
| 4 | 20 | 1.5 | 1.5 | 70 | 2.1 | | | |
| 5 | 20 | 1.5 | 2.0 | 73 | 1.9 | | | |
| 6 | 15 | 1.5 | 1.8 | 39 | 3.9 | 80 | 17 | 3 |
| 7 | 20 | 1.5 | 2.0 | 64 | 2.2 | | | |
| 8 | 15 | 0.9 | 1.1 | 43 | 2.0 | | | |

EXAMPLE VIII

A purified isoprene (IP) in benzens solution containing 133.0 grams of isoprene per liter of solution was charged to a number of 4-ounce reaction bottles. Nitrogen was flushed over the surface of the premix and the catalyst charged by the in situ technique in the amounts shown in Table 8 below. The catalyst system employed consisted of (1) dialkylaluminum halide [HALIDE], (2) uranyl acetylacetonate [$UO_2(AcAc)_2$] and (3) triisobutylaluminum. The dialkylaluminum halide used in Experiment No. 1 was diethylaluminum chloride (DEAC) while diethylaluminum bromide (DEAB) was employed in Experiment Nos. 2 and 3. After the addition of the individual catalyst components, each bottle was tightly sealed and tumbled end-over-end for 19 hours in a 50°C. water bath. At the end of this time all experiments were terminated by adding 1 parts of antioxidant per 100 parts of monomer and then coagulating with methanol. The data are shown in Table 8.

TABLE 8

| Experiment No. | Millimoles/100 g. IP | | | Yield, weight percent | [$\eta$] | Microstructure, percent | |
|---|---|---|---|---|---|---|---|
| | TIBA | $UO_2(AcAc)_2$ | Halide | | | Cis-1,4 | 3,4- |
| 1 | 15 | 0.5 | 1.2 | 23 | 0.8 | 93 | 7.0 |
| 2 | 15 | 0.5 | 0.6 | 34 | 1.0 | 92.5 | 7.5 |
| 3 | 15 | 0.9 | 1.2 | 40 | 1.1 | ¹ND | ND |

¹ ND = Not determined.

No trans 1,4- or 1,2- structure was observed in the infrared diffraction patterns obtained on these polymers.

EXAMPLE IX

A purified butadiene (BD)-isoprene (IP) premix solution containing 44.5 g. of BD and 55.5 g. of IP respectively per liter of solution was charged to two 4-ounce reaction bottles. The monomers were copolymerized utilizing a catalyst system consisting of uranyl acetylacetonate [$UO_2(AcAc)_2$], triisobutylaluminum (TIBA) and a dialkylaluminum halide (Halide) compound. The dialkylaluminum halide employed in Experiment No. 1 was diethylaluminum chloride (DEAC) while diethylaluminum bromide (DEAB) was employed in Experiment No. 2. Both bottles were flushed with nitrogen, tightly sealed and tumbled end-over-end in a 50°C. water bath for 18 hours. At the end of this time 1 part of antioxidant per 100 parts of the monomers was added. The polymers were then coagulated with methanol and dried under vacuum. All pertinent data are listed in Table 9.

TABLE 9

| Expt. No. | Millimoles/100 g. BD-IP | | | Yield, Wt. % | [$\eta$] |
|---|---|---|---|---|---|
| | TIBA | $UO_2(AcAc)_2$ | Halide | | |
| 1 | 150.9 | | 1.2 | 20 | 1.4 |
| 2 | 150.9 | | 1.2 | 30 | 1.1 |

EXAMPLE X

A purified butadiene in benzene solution containing 100 grams of butadiene per liter of solution was charged to a number of 4-ounce bottles. The catalyst system employed consisted of (1) triisobutylaluminum (TIBA), (2) thorium acetylacetonate [$Th(AcAc)_4$] and (3) hydrogen iodide (HI). The catalysts were charged in situ in the amounts shown in Table 10. The polymerizations were conducted at 50°C. for 39 hours except Experiment No. 4 was allowed to continue for 84 hours. Data are presented in Table 10.

TABLE 10

| Expt. No. | Millimoles/100g. BD | | | Yield, Wt. % | [$\eta$] | % Cis-1,4ª |
|---|---|---|---|---|---|---|
| | TIBA | $Th(AcAc)_4$ | HI | | | |
| 1 | 20 | 0.5 | 0.2 | 40 | NDᵇ | ND |
| 2 | 20 | 0.5 | 0.4 | 54 | 0.6 | 89 |
| 3 | 20 | 0.9 | 0.4 | 51 | 1.4 | ND |
| 4 | 20 | 0.9 | 1.0 | 52 | 1.2 | 92 |
| 5 | 20 | 1.5 | 0.3 | 22 | 3.0 | – |
| 6 | 20 | 1.5 | 0.6 | 39 | 1.5 | 89 |

(a)—all polymers also contained 3.2 ± 0.5% 1,2-structure and the remainder was the trans 1.4-structure.
(b)—ND = not determined.

EXAMPLE XI

A series of experiments was conducted using the general procedure described in Example X, but employing various alkylaluminum ($R_1R_2R_3Al$) compounds as alternates for the TIBA. The amounts of $Th(AcAc)_4$ and HI charged in all of these experiments were held constant at 0.9 and 0.7 millimole/100g. BD, respectively. Data are presented in Table 11.

TABLE 11

| Experiment No. | $R_1R_2R_3Al$ | Millimols/ 100 g. BD | Yield, weight percent | $[\eta]$ | Microstructure, percent | | |
|---|---|---|---|---|---|---|---|
| | | | | | Cis-1,4 | Trans-1,4 | 1,2- |
| 1 | TIBA | 20 | 33 | 1.3 | 91.6 | 4.7 | 3.7 |
| 2 | TIHA | 10 | 28 | 2.7 | 91.2 | 5.0 | 3.8 |
| 3 | TIHA | 20 | 68 | ¹ND | ND | ND | ND |
| 4 | TNHA | 10 | 15 | 3.5 | 90.3 | 5.9 | 3.8 |
| 5 | DIBA-H | 10 | 26 | 2.1 | 91.1 | 5.4 | 3.5 |
| 6 | DIBA-H | 20 | 40 | ND | ND | ND | ND |

¹ ND = Not determined.

EXAMPLE XII

A series of experiments was conducted under conditions similar to those outlined in Example No. X except that various halide containing compounds were utilized as the third catalyst component. The amounts of TIBA and Th(AcAc)$_4$ charged to each of these polymerizations were 20 and 1.5 millimoles/100 g.BD respectively. Polymerization time was 39 hours. All data are presented in Table 12.

TABLE 12

| Experiment No. | Halide compound | Millimole/ 100 g. BD | Yield, weight percent | $[\eta]$ | Microstructure, percent | | |
|---|---|---|---|---|---|---|---|
| | | | | | Cis | Trans | 1,2- |
| 1 | HI | 0.6 | 39 | 1.5 | 89.2 | 7.2 | 3.6 |
| 2 | DEAB | 0.6 | 14 | 2.8 | 79.5 | 17.6 | 2.9 |
| 3 | DEAC | 0.6 | 10 | 2.0 | 63.0 | 33.8 | 3.2 |
| 4 | HF | 8.0 | 11 | ND | 49.8 | 46.4 | 3.8 |

EXAMPLE XIII

A purified butadiene in benzene solution was prepared as described in Example I. The catalyst employed was a "preformed" catalyst prepared by combining UO$_2$(AcAc)$_2$, TIBA, DEAC and a small amount of butadiene monomer and aging this mixture for 6 hours at room temperature. Small aliquots of this preformed catalyst were then injected into 4-ounce bottles containing the above purified butadiene in benzene solution and the reactions allowed to continue for 17 hours at 50°C. All pertinent data are listed in Table 13 below.

TABLE 13

| Expt. No. | Preformed Catalyst Millimoles/100g. BD Charged | | | yield wt.% | $[\eta]$ |
|---|---|---|---|---|---|
| | BDTIBA | UO$_2$(AcAc)$_2$ | DEAC | | |
| 1 | 10 6.7 | 0.35 | 0.4 | 33 | 1.9 |
| 2$^a$ | 15 10.0 | 0.53 | 0.6 | 59 | 1.6 |
| 3 | 25 16.7 | 0.89 | 1.0 | 80 | ND |

(a) The microstructure of the polymer produced in this experiment was found to be 87% cis-1,4-; 9% trans-1,4- and 4% 1,2-polybutadiene.
(b) ND = not determined.

While certain representative embodiments and details have been shown for the purpose of illustrating the invention, it will be apparent to those skilled in this art that various changes and modifications may be made therein without departing from the spirit or scope of the invention.

What is claimed is:

1. A process for the polymerization of conjugated diolefins and mixtures thereof to form polymers containing 90 percent or more of the polymer repeat units in the 1,4 configuration which comprises contacting at least one conjugated diolefin with a catalyst system comprising
    A. at least one compound selected from the group consisting of metal salts of carboxylic acids, metal salts of inorganic acids and organic complex compounds of metals wherein the metal is selected from the group consisting of uranium and thorium,
    B. at least one compound selected from the group consisting of trialkylaluminum and dialkylaluminum hydrides and
    C. at least one halide ion-containing compound selected from the group consisting of
        1. hydrogen halides,
        2. organometallic halides wherein the metal is selected from Groups II, III-A and IV-A of the Periodic Table, and
        3. halides of metals of Groups III, IV, V, VI-B and VIII of the periodic Table,
    and wherein the mole ratio of the catalyst component (B) to catalyst component (A) ranges from about 5:1 to about 60:1 and wherein the mole ratio of catalyst component (C) to catalyst component (A) ranges from about 0.5:1 to about 2.5:1.

2. The process according to claim 1 wherein the conjugated diolefin is butadiene.

3. The process according to claim 1 wherein a mixture of conjugated diolefins consisting of butadiene and isoprene is polymerized.

4. The process according to claim 1 wherein the trialkylaluminum compound is selected from a group consisting of triisobutylaluminum and triisohexylaluminum.

5. The process according to claim 1 in which the dialkylaluminum hydride is diisobutylaluminum hydride.

6. The process according to claim 1 in which the halide ion is selected from a group consisting of bromide, chloride and iodide ions.

7. The process according to claim 1 wherein the halide ion containing compound is selected from a group consisting of hydrogen bromide, hydrogen chloride, hydrogen iodide, diethylaluminum bromide, diethylaluminum iodide and ethylaluminum dichloride.

8. The process according to claim 1 wherein the mole ratio of (C)/(A) ranges from about 0.7/1 to about 1.5/1.

9. The process according to claim 1 wherein the mole ratio of (B)/(A) ranges from about 6/1 to 40/1.

10. A catalyst composition comprising
    A. at least one compound selected from a group consisting of metal salts of carboxylic acids, metal salts of inorganic acids and organic complex compounds of metals wherein the metal is selected from a group consisting of uranium and thorium,
    B. at least one compound selected from the group consisting of trialkylaluminum and dialkylaluminum hydrides and
    C. at least one halide ion-containing compound selected from the group consisting of
        1. hydrogen halides,
        2. organometallic halides wherein the metal is selected from Groups II, IIIA and IVA of the Periodic Table, and
        3. halides of metals of Groups III, IV, VIB and VIII of the Periodic Table and wherein the mole ratio (B)/(A) ranges from about 6/1 to about 40/1 and the mole ratio of (C)/(A) ranges from about 0.7/1 to about 1.5/1.

* * * * *